US010396324B2

(12) United States Patent
Chitaka

(10) Patent No.: US 10,396,324 B2
(45) Date of Patent: Aug. 27, 2019

(54) FIXING DEVICE

(71) Applicant: DENSO CORPORATION, Kariya, Aichi-pref. (JP)

(72) Inventor: Hiroki Chitaka, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/765,497

(22) PCT Filed: Sep. 5, 2016

(86) PCT No.: PCT/JP2016/075932
§ 371 (c)(1),
(2) Date: Apr. 3, 2018

(87) PCT Pub. No.: WO2017/061202
PCT Pub. Date: Apr. 13, 2017

(65) Prior Publication Data
US 2019/0074493 A1 Mar. 7, 2019

(30) Foreign Application Priority Data
Oct. 5, 2015 (JP) .................. 2015-197774

(51) Int. Cl.
H01M 2/04 (2006.01)
H01M 2/10 (2006.01)

(52) U.S. Cl.
CPC ....... H01M 2/1083 (2013.01); H01M 2/0434 (2013.01); H01M 2/1072 (2013.01)

(58) Field of Classification Search
CPC . H01M 2/1083; H01M 2/0434; H01M 2/1072
See application file for complete search history.

(56) References Cited

U.S. PATENT DOCUMENTS 9,606,575 B2 * 3/2017 Gerst .................... G06F 1/1626
2010/0270050 A1 * 10/2010 Wang ..................... G06F 1/181
174/50

FOREIGN PATENT DOCUMENTS

JP    H07037563 A    2/1995
JP    H08162077 A    6/1996
JP    2015015579 A   1/2015

* cited by examiner

Primary Examiner — Anita M King
(74) Attorney, Agent, or Firm — Harness, Dickey & Pierce, P.L.C.

(57) ABSTRACT

A fixing device has a body case therein defining a housing chamber in which an object is housed and a cover that covers the housing chamber. The body case has one of a groove and a protrusion that engage with each other. The object has an other one of the groove and the protrusion. The groove includes a receiving portion and a positioning portion. The receiving portion extends in an inserting direction in which the object is inserted into the housing chamber. The positioning portion extends in an intersecting direction intersecting with the inserting direction. The cover has a restricting portion that is in contact with the object while the cover covers the housing chamber. The protrusion engages with the positioning portion when the object is fixed in the body case. The restricting portion restricts a displacement of the object in a direction opposite to the intersecting direction.

6 Claims, 11 Drawing Sheets

FIXING DEVICE

CROSS REFERENCE TO RELATED APPLICATIONS

This application is a U.S. National Phase Application under 35 U.S.C. 371 of International Application No. PCT/JP2016/075932 filed on Sep. 5, 2016 and published in Japanese as WO 2017/061202 A1 on Apr. 13, 2017. This application is based on and claims the benefit of priority from Japanese Patent Application No. 2015-197774 filed on Oct. 5, 2015. The entire disclosures of all of the above applications are incorporated herein by reference.

TECHNICAL FIELD

The present disclosure relates to a fixing device that fixes an object therein.

BACKGROUND ART

A device, such as a mobile device and a camera, having a battery pack is configured to fix a battery to be removable. The battery pack is housed in a housing chamber defined in a body case of the device and is fixed to the body case in the housing chamber not to be removed easily.

A fixing structure that fixes the battery pack is known to retain the battery pack by the body case such that the body case receives a force applied thereto in a direction in which the battery pack comes out of the body case (refer to Patent Literature 1). Alternatively, a cover is mounted to the body case to retain the battery pack, and the body case holds the cover. When retaining the battery pack by the cover, the cover prevents the battery pack from coming out of the body case.

However, the battery pack may slip on the body case or on the cover when an angle between the battery pack and the body case or the cover at a position where the battery pack is in contact with the body case or the cover is small while the battery pack or the cover is attached to the body case. Therefore, a direction in which the body case receives the force applied thereto from the battery pack when the battery pack comes out of the body case in a removing direction, i.e., a direction in which a stopper of the battery pack receives a force, crosses the removing direction at a right angle or at a large angle preferably.

Then, according to the fixing structure, the body case has a groove, which has an L-shape in cross section, and the battery pack or the cover has a protrusion. The protrusion fits into the groove, whereby the body case receives the force applied thereto from the battery pack or the cover in the removing direction.

PRIOR ART LITERATURES

Patent Literature

Patent Literature 1: JP H8-162077 A

SUMMARY OF INVENTION

For example, a vehicle mounts a backup battery for an emergency call unit. Since there is a space limitation in the vehicle, the backup battery may be necessary to be removed from an upper opening of a body case of the emergency call unit, and the upper opening is covered by a cover. In the emergency call unit, the backup battery is required to be certainly prevented from coming out of the body case even when an impact is made on the vehicle. Therefore, a fixing structure for the backup battery of the emergency call unit is necessary to have resistance to impact.

Since the cover receives the force, which is applied thereto from the battery pack in the removing direction, as the above-described conventional technique, the cover is fixed to the body case by a method such as screwing using a screw. However, the screwing may raise a cost, and exchanging battery packs may deteriorate workability, when the cover is fixed to the body case by the screwing.

Then, it is considered to provide a structure in which the body case holds the battery pack as the above-described conventional technique. According to this structure, the force does not have an effect on the cover. Therefore, the cover is fixed to the body case by snap fitting. Specifically, the body case has a groove and the battery pack has a pin, or the body case has a pin and the battery pack has a groove such that the battery pack is fixed to the body case. The battery pack is inserted into the body case, and then slid in the body case to exert a fixing function. The battery pack can be removed from the body case by doing the opposite.

However, according to the above-described structure, the battery pack is necessary to be pressed against the body case before sliding on the body case. By sliding the battery pack on the body case, the battery pack necessarily has a knob. When there is no space in the battery pack to provide the knob, the battery pack may be hardly slid on the body case.

The present disclosure addresses the above-described issues, and whereby it is an objective of the present disclosure to provide a fixing device that can be downsized and fix an object therein.

According to an aspect of the present disclosure, a fixing device has a body case and a cover. The body case therein defines a housing chamber in which an object is housed. The cover is in contact with the body case and covers the housing chamber when the object is housed in the housing chamber. The body case has one of a groove and a protrusion that engage with each other. The object has an other of the groove and the protrusion. The groove includes a receiving portion and a positioning portion. The receiving portion extends in an inserting direction in which the object is inserted into the housing chamber. The positioning portion extends in an intersecting direction intersecting with the inserting direction. The receiving portion has an end in the inserting direction, and the positioning portion extends from the end of the receiving portion in the intersecting direction. The cover has a restricting portion that is in contact with the object while the cover covers the housing chamber. The protrusion engages with the positioning portion when the object is fixed in the body case. The restricting portion restricts a displacement of the object relative to the body case in a direction opposite to the intersecting direction.

According to the above-described configuration, the protrusion engages with the positioning portion when the object is fixed in the body case. As a result, a displacement of the protrusion in the inserting direction and in a direction opposite to the inserting direction is suppressed. In addition, the restricting portion of the cover suppresses the displacement of the object relative to the body case in the direction opposite to the intersecting direction. Thus, a displacement of the object in the inserting direction and the intersecting direction is suppressed, whereby the object can be fixed in the housing chamber certainly.

When fixing the object, a position of the object inside the housing chamber is adjusted such that the receiving portion of the groove engages with the protrusion. Subsequently, the cover is attached. The restricting portion of the cover pushes the object, whereby the protrusion engages with the positioning portion extending in the intersecting direction. Thus, the object can be fixed only by inserting the object into the housing chamber and attaching the cover. That is, the object can be fixed in a simple way. Furthermore, the fixing device can be downsized since the object can be attached to the positioning portion without a knob or a pressing surface.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Figure 1:
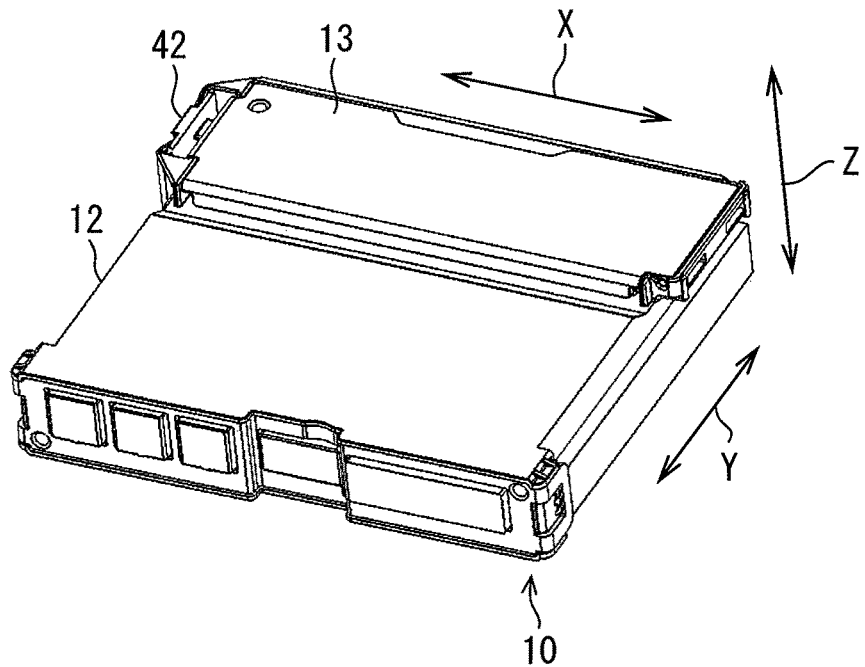
FIG. 1 is a perspective view illustrating an emergency call unit.

An embodiment of the present disclosure will be described referring to FIG. 1 through FIG. 15. FIG. 1 shows an emergency call unit 10 mounted to a vehicle. The emergency call unit 10 sends an urgent message to an information addressee, e.g., an emergency center, in a state of emergency such as a car accident of the vehicle. For example, the emergency call unit 10 is a communication module, e.g., a DCM (Data Communication Module), for a telematics service.

A main battery or a backup battery 11 supplies electricity to the emergency call unit 10. The main battery is a main power source that supplies electricity to various electric loads, i.e., various electric devices, of the vehicle. The main battery can be used as a power source that supplies electricity to a starter when starting an engine. That is, the main battery is a main power source of the emergency call unit 10. For example, the main battery is configured by a lead battery. The main battery may supply electricity when an electric power source of an accessary (ACC) of the vehicle is turned on.

The backup battery 11 is a secondary electric power source serving as a substitute power source for the main battery and supplies electricity at least to the emergency call unit 10. The backup battery 11 serves as the secondary electric power sources when the main battery stops supplying electricity. For example, the main battery stops supplying electricity when the main battery is broken by a car accident or when a supply line through which the main battery supplies electricity is shut off. The backup battery 11 is configured by a secondary battery that is attached to be removable.

The secondary battery used as the backup battery 11 is long lasting and can operate in a temperature range from $-30°$ C. to $85°$ C. For example, the backup battery 11 is a lithium-ion secondary battery or a lithium-ion-polymer secondary battery. The lithium-ion secondary battery uses an organic solvent having a lower melting point than water, therefore being used when a temperature is low. In addition, the lithium-ion secondary battery is long lasting since having a greater self-discharge characteristic as compared to another secondary battery such as a nickel-cadmium battery and a nickel-hydrogen storage battery. Moreover, the lithium-ion secondary battery can be downsized and have less effect on mountability. The lithium-ion secondary battery may be a nickel-hydrogen secondary battery or a secondary battery other than the lithium-ion-polymer secondary battery.

The above-described backup battery 11 will be referred to as the battery 11. The battery 11 is inserted into a body case 12 and then covered by a cover 13. Accordingly, the battery 11 is housed inside the body case 12 without exposing a surface of the battery 11.

Here, the emergency call unit 10 has a product-specific limitation in attaching, removing, and fixing the battery 11. The product-specific limitation will be described hereinafter.

(1) The body case 12 has an opening 12a that is open in an upper surface of the body case 12, and the battery 11 is inserted into the body case 12 or removed from the body case through the opening 12a. Accordingly, when removing the battery 11, the battery 11 has to come out of the body case 12 upward.

(2) It is limited to increase a size of the body case 12, whereby the body case 12 cannot include a knob to pull up the battery 11. Accordingly, a way to pull up the battery 11 for removing the battery 11 cannot be employed.

(3) A clearance for pinching the battery 11 cannot be defined between the battery 11 and the body case 12 on a lateral side of the battery 11. Accordingly, a way to pinch the battery 11 for removing the battery 11 cannot be employed.

(4) The battery 11 has a cuboid shape. When moving the battery 11 while the battery 11 is located inside the body case 12, it is possible only to push one short side of a pair of short sides and a pair of long sides of the battery 11, e.g., by a finger of a user. That is, a movement of the battery 11 is limited to only sliding in a longitudinal direction of the battery 11.

(5) A water-stop rib 21 is required to be provided around the battery 11, which is housed in the body case 12, to suppress an inflow of water into a housing chamber 12b. The water-stop rib 21 is located above the battery 11 on a condition where the battery 11 is housed in the body case 12. Therefore, the battery 11 cannot be pull up over the water-stop rib 21 only by sliding the battery 11. Here, as described above regarding the limitation (4), a movement of the battery 11 is limited to only sliding in the longitudinal direction of the battery 11. Thus, a configuration that enables the battery 11, with one finger of the user, to be movable in an up-down direction only by sliding the battery 11 in the longitudinal direction and to be pulled up from the housing chamber 12b.

(6) When mounting the emergency call unit 10 to the vehicle, it is required to suppress a gap defined between the battery 11 and the body case 12 to suppress noise. Therefore, the battery 11 is required to be lightly fitted into the body case 12 such that no clearance is defined between pins 31 of the battery 11 and the body case 12 or a small clearance is defined between the pins 31 of the battery 11 and the body case 12 so as to enable the battery 11 to slide on the body case 12. In addition, when each of the pins 31 is in a surface-contact with the body case 12, friction between the pins 31 and the body case 12 becomes large. Accordingly, the pin is in a line-contact with the body case 12 preferably.

Figure 2:
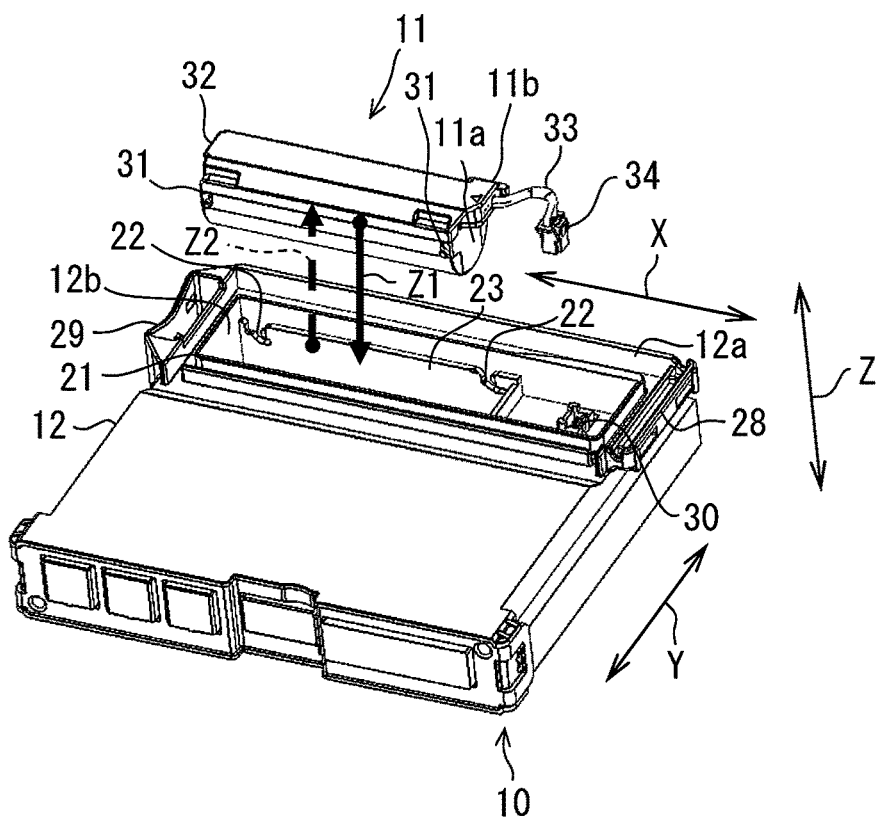
FIG. 2 shows a state before a battery is inserted into the emergency call unit.
Figure 3:
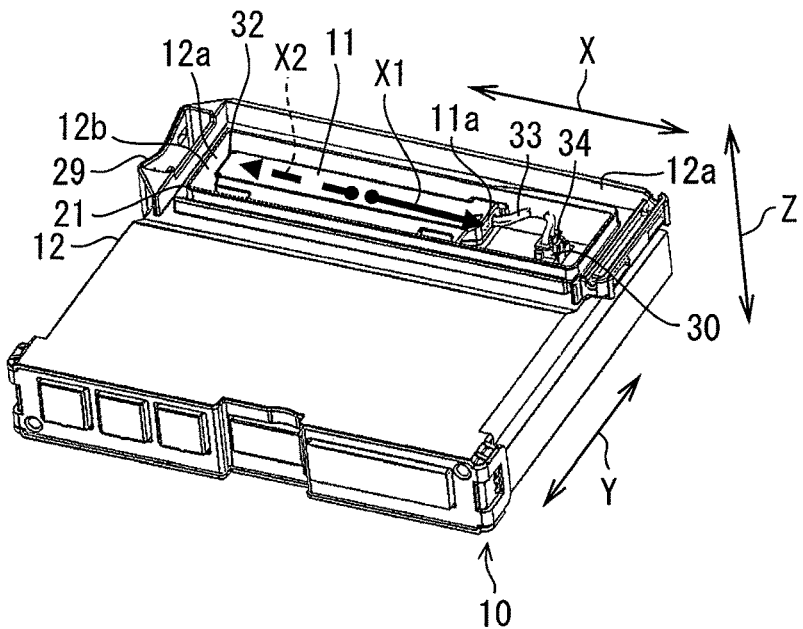
FIG. 3 shows a state that the battery is inserted into a housing chamber.
Figure 4:
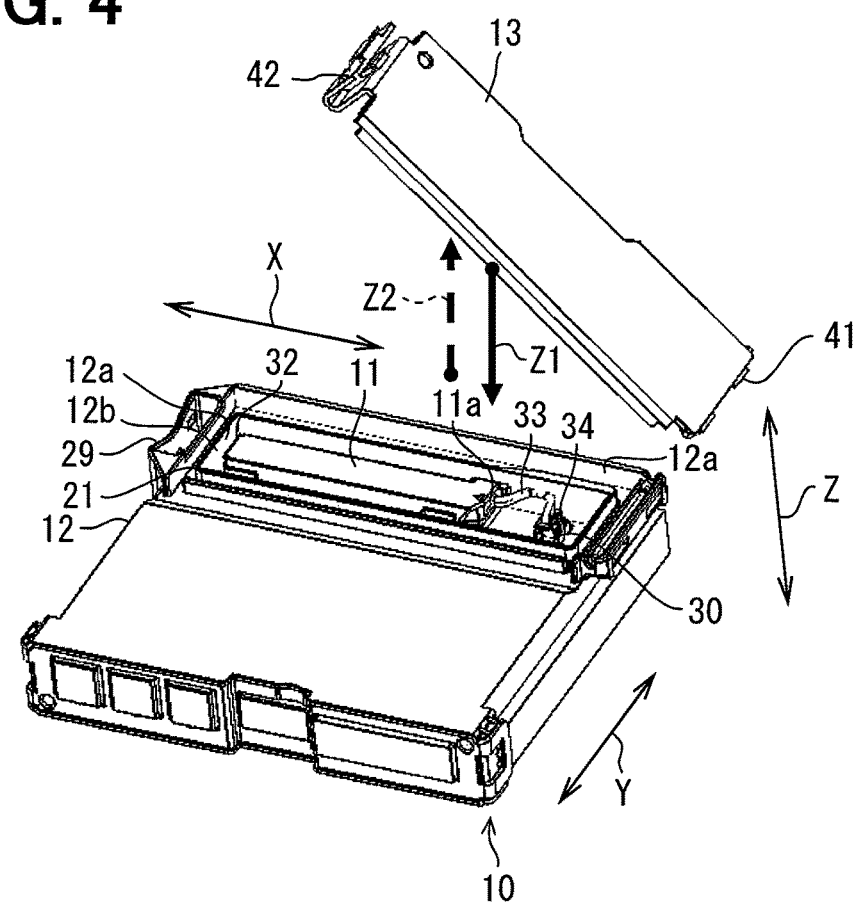
FIG. 4 shows a state before a cover is attached.

In view of the above-described limitations (1) to (6), the emergency call unit 10 has a fixing device that fixes the battery 11. The fixing device includes the battery 11, the body case 12, and the cover 13. As shown in FIG. 2, the battery 11 has an elongated member having the cuboid shape. Specifically, an upper surface of the battery 11 has a flat rectangular shape, and a lower surface of the battery 11 is curved and has a semi-circular shape. The body case 12 therein defines the housing chamber 12b in which the battery 11 is housed. As shown in FIG. 2 and FIG. 3, the housing chamber 12b is defined such that a clearance is not defined between the battery 11 and the body case 12 when the battery 11 is housed in the housing chamber 12b. Alternatively, the housing chamber 12b is defined such that a slight clearance is defined between the battery 11 and the body case 12. As shown in FIG. 1 and FIG. 4, the cover 13 is in contact with the body case 12 and covers the housing chamber 12b when the battery 11 is housed in the housing chamber 12b.

The battery 11 is elongated in a longitudinal direction X. The longitudinal direction X includes a fixing direction X1 in which the battery 11 is slid to be fixed to the body case 12 and a removing direction X2 in which the battery 11 is slid to be removed from the body case 12. The fixing direction X1 and the removing direction X2 are opposite to each other. A direction in which the battery 11 is displaced when being inserted to and being removed from the body case 12 is referred to as the up-down direction Z. The up-down direction Z intersects with the longitudinal direction X. According to the present embodiment, the up-down direction X is perpendicular to the longitudinal direction X. The up-down direction Z includes a downward direction Z1 in which the battery 11 is inserted into the housing chamber 12b and an upward direction Z2 in which the battery 11 is pulled up from the housing chamber 12b. The downward direction Z1 and the upward direction Z2 are opposite to each other. Hereinafter, a direction perpendicular to both of the up-down direction Z and the longitudinal direction X will be referred to as a width direction Y.

Figure 5:
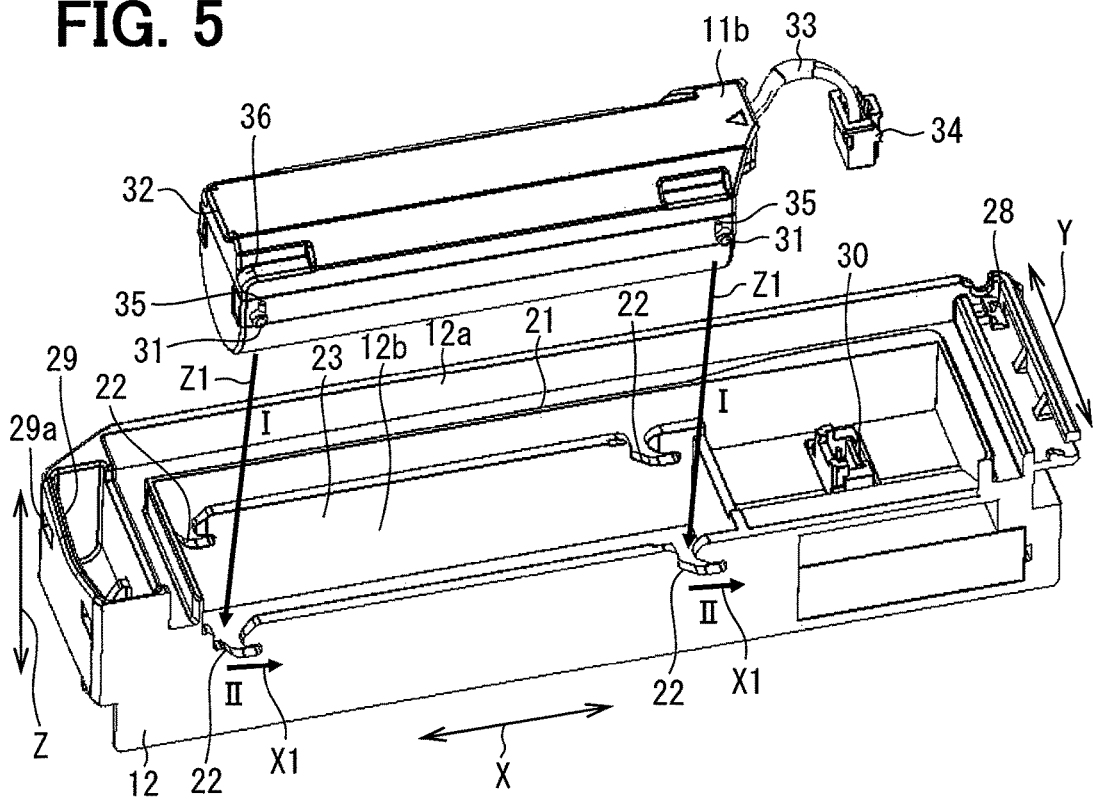
FIG. 5 is a diagram illustrating how to the battery is attached.

As shown in FIG. 5, the battery 11 includes protrusions. The protrusions will be referred to as the pins 31 hereafter. The body case 12 has grooves 22 that engage with the pins 31 respectively. Specifically, the battery 11 has a pair of surfaces extending in the longitudinal direction X and facing each other in the width direction Y. Each of the pair of surfaces includes two pins 31 located to be distanced from each other in the longitudinal direction X. That is, according to the present embodiment, a quantity of the pins 31 is four. The pins 31 have a columnar shape and are in a line-contact with the grooves 22 respectively.

An electric cord 33 is connected to an end of the battery 11 in the fixing direction X1. An end of the electric cord 33, which is opposite to an end connected to the battery 11, is coupled with a connector 34. The connector 34 is configured to be connected to a terminal 30 provided in the body case 12. The battery 11 supplies electricity to the emergency call unit 10 when the connector 34 and the terminal 30 are connected to each other.

Figure 8:
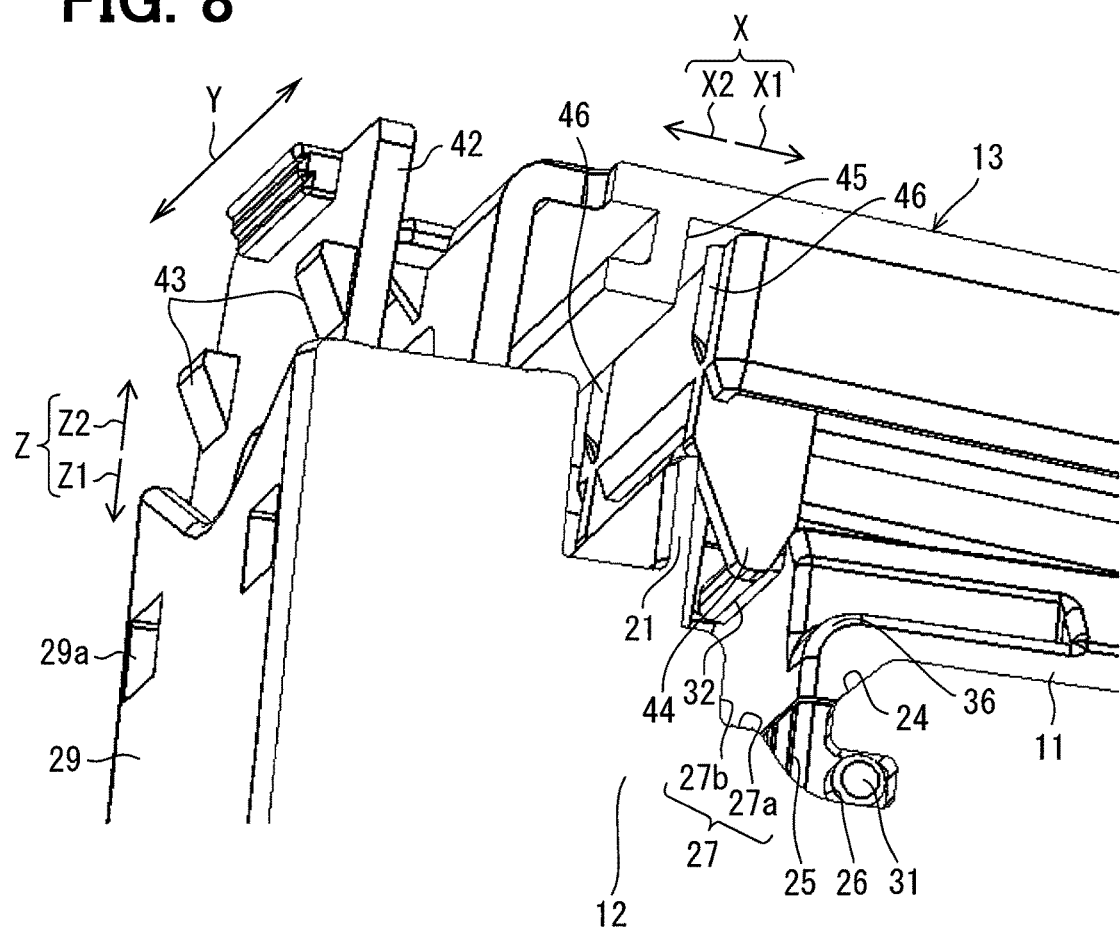
FIG. 8 is an enlarged perspective view illustrating a part of the emergency call unit.

The body case 12 has a pair of sidewalls 23 extending in the longitudinal direction X, facing each other in the width direction Y, and defining the housing chamber 12b. Each of the pair of sidewalls 23 includes two grooves 22 located to be distanced from each other in the longitudinal direction X. That is, according to the present embodiment, a quantity of the grooves 22 is four. As shown in FIG. 5 and FIG. 8, each of the grooves 22 includes a receiving portion 24 extending in the downward direction Z1, an inclining portion 25 extending in an inclining direction, and a positioning portion 26 extending in the longitudinal direction X. Thus, each of the grooves 22 has a L-shape in a side view.

The receiving portion 24 is open widely in the upward direction Z2. An opening area of the receiving portion 24 decreases toward the downward direction Z1. In other words, inlets of the grooves 22 have a tapered shape to suppress interferences between the grooves 22 and the pins 31. Therefore, the pins 31 can be guided to the inlets of the grooves 22, and can be guided to bottoms of the grooves 22 smoothly.

The receiving portion 24 has a lower end in the downward direction Z1. The inclined portion 25 extends from the lower end of the receiving portion 24. The inclined portion 25 extends in the fixing direction X1 toward the downward direction Z1. In other words, the inclining portion 25 extends such that a distance between the lower end of the receiving portion 24 and the inclining portion 25 in the fixing direction X1 (i.e., an intersecting direction) increases toward the downward direction Z1 (i.e., an inserting direction). That is, the inclining portion 25 extends such that the distance between the lower end of the receiving portion 24 and the inclining portion 25 in the longitudinal direction X decreases in the upward direction Z2. The inclining direction is a direction in which the inclining portion 25 extends. The inclining portion 25 connects the receiving portion 24 and the positioning portion 26.

The inclining portion 25 has one end and an other end in the inclining direction. The one end is connected to the receiving portion 24 and the other end is connected to the positioning portion 26. The positioning portion 26 extends from the other end in the fixing direction X1. The positioning portion 26 includes an area where the corresponding one of the pins 31 is located at least when the object 11 is fixed to the body case 12. A dimension of the area in the up-down direction Z is set such that the shape of the area fits to an exterior shape of the corresponding one of the pins 31 or such that the corresponding one of the pins 31 can be lightly fitted into the positioning portion 26.

Two grooves 22 defined in end portions of the sidewalls 23 in the fixing direction X1 have a different shape from the rest two grooves 22 defined in end portions of the sidewalls 23 in the removing direction X2. Each of the rest two grooves 22 defined in the end portions of the sidewalls 23 in the removing direction X2 has a corner 27. The corner 27 is included in the receiving portion 24. The corner 27 includes a flat surface 27a extending in the longitudinal direction X and a stopper surface 27b that suppresses a replacement of the object 11 in the removing direction X2. A length of the flat surface 27a is set such that a corresponding one of the pins 31 can be located thereon.

In each of the rest two grooves 22 defined in the end portions of the sidewalls 23 in the removing direction X2, a dimension of the receiving portion 24 in the longitudinal direction X increases for the corner 27. On the other hand, in the two grooves 22 defined in the end portions of the sidewalls 23 in the fixing direction X1, a dimension of the receiving portion 24 in the longitudinal direction X is set slightly larger than an outside diameter of the pins 31. In other words, in the two grooves 22, the dimension of the receiving portion 24, which extends in the up-down direction Z, is set such that the corresponding one of the pins 31 passes therethrough barely.

The battery 11 has a short surface facing in the removing direction X2 and extending in the up-down direction Z and the width direction Y. The short surface includes a bulge 32. As shown in FIG. 5, the bulge 32 protrudes from an end of the short surface, which is an end in the upward direction Z2, in the removing direction X2.

Figure 12:
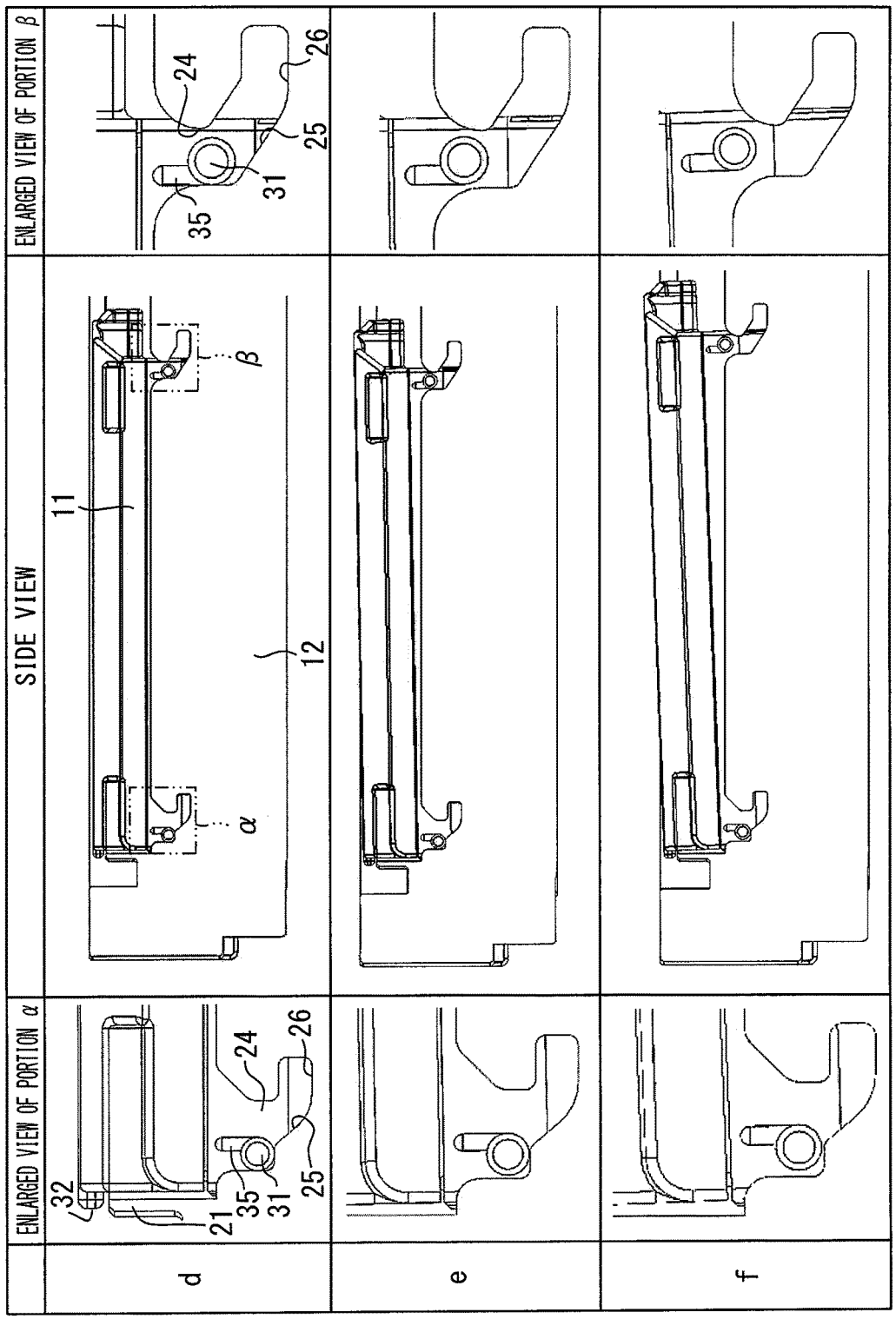
FIG. 12 is a diagram illustrating how the cover is removed.

As shown in a state (d) illustrated in FIG. 12, the body case 12 includes the water-stop rib 21 serving as a supporting portion. As shown in FIG. 12, the bulge 32 is located above the water-stop rib 21 in the upward direction Z2 when the pin 31 is located on the flat surface 27a in the corner 27. In other words, the battery 11 has a single bulge 32 at an upper end of the battery 11, and the single bulge 32 overlaps with the water-stop rib 21.

An end of the inclined portion 25 is in contact with the pin 31 on a condition where the bulge 32 is stuck with the water-stop rib 21 immediately above the water-stop rib 21 and the battery 11 is positioned horizontally, i.e., the battery 11 is positioned as shown in a state (e) illustrated in FIG. 12. The bulge 32 and the water-stop rib 21 are kept to be in contact with each other such that the water-stop rib 21 serves as a fulcrum when moving side surfaces of the battery 11, which face each other in the fixing direction X1, in the uppward direction Z2 to remove the battery 11.

As shown in FIG. 4, the cover 13 has a plate shape and includes a pawl 41 and a snap-fitting portion 42. The pawl 41 is provided with an edge of the cover 13 in the fixing direction X1. The snap-fitting portion 42 is provided with an edge of the cover 13 in the removing direction X2. The body case 12 includes a portion that is covered by the cover 13. An end of the portion of the body case 12 in the fixing direction X1 has a recessed portion 28 that engages with the pawl 41. Another end of the portion of the body case 12, which is covered by the cover 13, in the removing direction X2 has a receiving portion 29 that fits to the snap-fitting portion 42.

The pawl 41 is configured to be inserted into the recessed portion 28 in a direction that is inclined with respect to the up-down direction Z. The pawl 41 is prevented from moving in the up-down direction Z while being located inside the recessed portion 28. The snap-fitting portion 42 engages with the receiving portion 29 by rotating the cover 13 about the pawl 41, which serves as a fulcrum, in the downward direction Z1 about the pawl 41 while the pawl 41 is located in the recessed portion 28.

Figure 6:
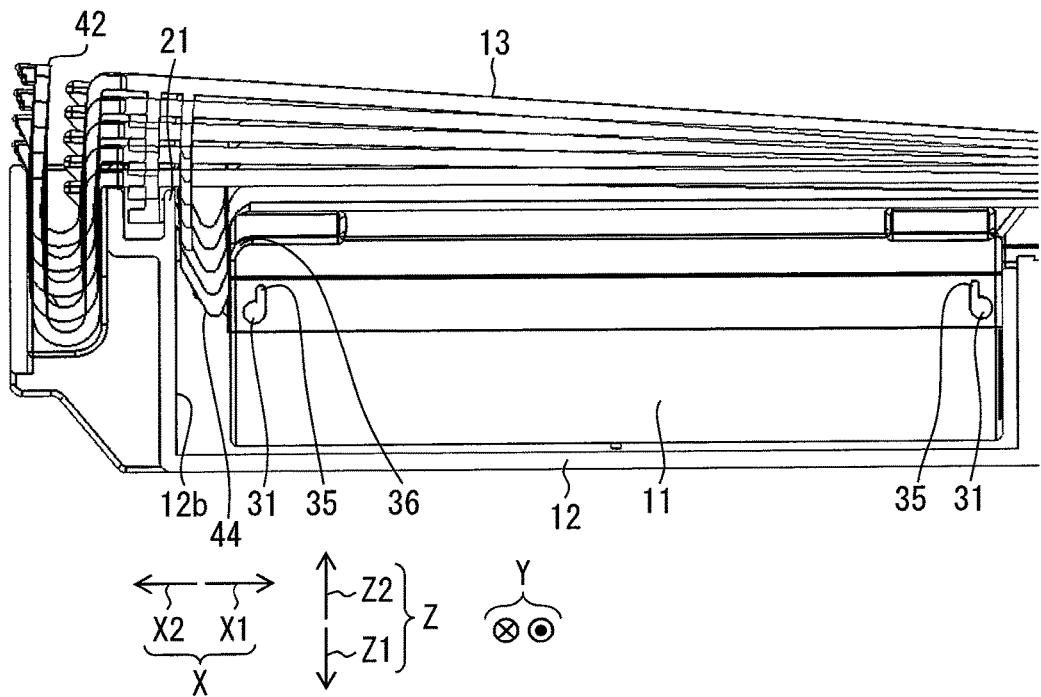
FIG. 6 is a diagram illustrating how the cover is attached.
Figure 7:
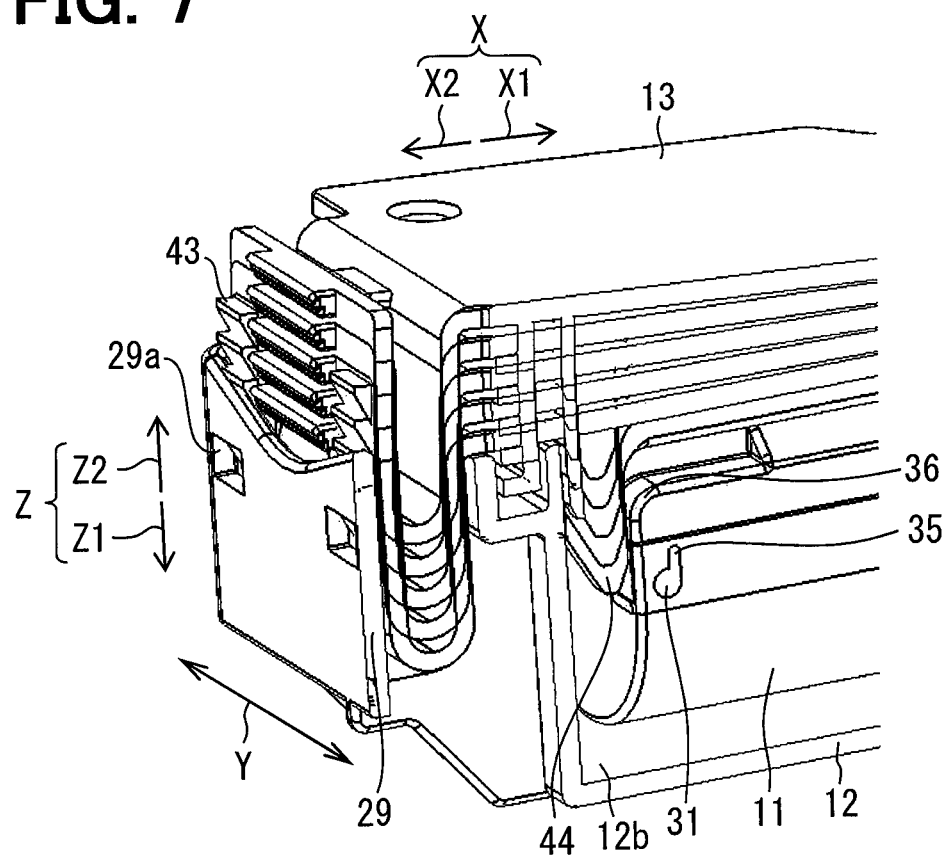
FIG. 7 is a diagram illustrating how the cover is attached.

As shown in FIG. 6 and FIG. 7, the snap-fitting portion 42 has a substantially U-shape in cross section and is elastically deformable. The receiving portion 29 has a specified shape to support the snap-fitting portion 42 being kept to be elastically deformed. Thus, when the snap-fitting portion 42 is inserted into the receiving portion 29, the snap-fitting portion 42 is elastically deformed and fixed to the receiving portion 29 by the elastic force.

The snap-fitting portion 42 includes a pawl 43 that protrudes in the removing direction X2. The receiving portion 29 includes an insertion hole 29a into which the pawl 43 is inserted. When the snap-fitting portion 42 is fixed to the receiving portion 29, the pawl 43 is located inside the insertion hole 29a. Therefore, the pawl 43 comes out from the insertion hole 29a only by elastically deforming the snap-fitting portion 42 such that a dimension of the snap-fitting portion 42 in a longitudinal direction X decreases. Thus, a displacement of the snap-fitting portion 42 in the up-down direction Z is restricted by the pawl 43 and the insertion hole 29a while the snap-fitting portion 42 is fixed to the receiving portion 29.

The water-stop rib 21 extends in the upward direction Z2 and surrounds the housing chamber 12b. Specifically, the water-stop rib 21 surrounds the housing chamber 12b when viewed in the downward direction Z1. As shown in FIG. 3, an upper rim of the water-stop rib 21 is located above an upper surface of the battery 11 in the upward direction Z2 when the battery 11 is located inside the housing chamber 12b. A lower surface of the cover 13 includes a water-stop groove 45 that engages with the water-stop rib 21. When the cover 13 is attached, the water-stop rib 21 and the water-stop groove 45 are engaged with each other, whereby a waterproof property is secured.

As shown in FIG. 7 and FIG. 8, the cover 13 includes a restricting portion 44 that is in contact with the battery 11 when the cover 13 covers the housing chamber 12b. The restricting portion 44 protrudes from the lower surface of the cover 13 in the downward direction Z1. In the present embodiment, two restricting portions 44 are provided to be distanced from each other in the width direction Y. The restricting portion 44 has a plate shape including a surface extending in the longitudinal direction X and the up-down direction Z. The restricting portion 44 has a tapered shape such that a dimension thereof in the longitudinal direction X decreases toward the downward direction Z1. A tip of the restricting portion 44 has, e.g., an arc shape. When the cover 13 is rotated in the downward direction Z1 as described above, the restricting portion 44 abuts on an end 36 of the battery 11, which is an end in the removing direction X2, and presses the battery 11 such that the battery 11 slides in the fixing direction X1.

The end 36 of the battery 11, the restricting portion 44 abutting thereon, has a curved shape in a side view. As a result, the end 36 of the battery 11 does not interrupt the restricting portion 44, whereby the restricting portion 44 presses the battery 11 to move in the fixing direction X1 smoothly. The pin 31 engages with the positioning portion 26 when the battery 11 is fixed inside the case body 12. The restricting portion 44 restricts a displacement of the battery 11 in the removing direction X2 with respect to the body case 12.

As shown in FIG. 8, the cover 13 includes a triangle rib 46 that abuts on the body case 12 when the cover 13 covers the housing chamber 12b. The triangle rib 46 protrudes from the cover 13 in the removing direction X2 and extends in the up-down direction Z. The triangle rib 46 has a tapered shape of which dimension in the width direction Y decreases toward the removing direction X2. Specifically, the triangle rib 46 has a triangle shape in a cross section viewed in the up-down direction Z. In the present embodiment, two triangle ribs 46 are provided to be distanced from each other in the width direction Y. The triangle rib 46 is in linear-contact with an inner wall of the body case 12 when the cover 13 is attached to the body case 12.

A movement of the battery 11 when being fixed to the body case 12 will be described hereafter referring to FIG. 9. In fixing the battery 11, the battery 11 is inserted into the housing chamber 12b from an upper side of the housing chamber 12b toward the downward direction Z1, i.e., the inserting direction, as shown in FIG. 2. Then, as shown in FIG. 5, the pin 31 moves to the inclining portion 25 through the receiving portion 24 of the groove 22. The pin 31 slides downward on the inclining portion 25 due to a weight of the battery 11 and is positioned on a side of the positioning portion 26 in the removing direction X2. In other words, the battery 11 moves to an inlet opening of the positioning portion 26, which is located deepest in the groove 22, i.e., which is a bottom portion of the groove 22, due to the weight of the battery 11 only by inserting the pin 31 of the battery 11 into the groove 22. When the pin 31 is positioned in the groove 22, the connector 34 is connected to the terminal 30 as shown in FIG. 3. Subsequently, the battery 11 is moved in the fixing direction X1 as shown in FIG. 5.

Figure 9:
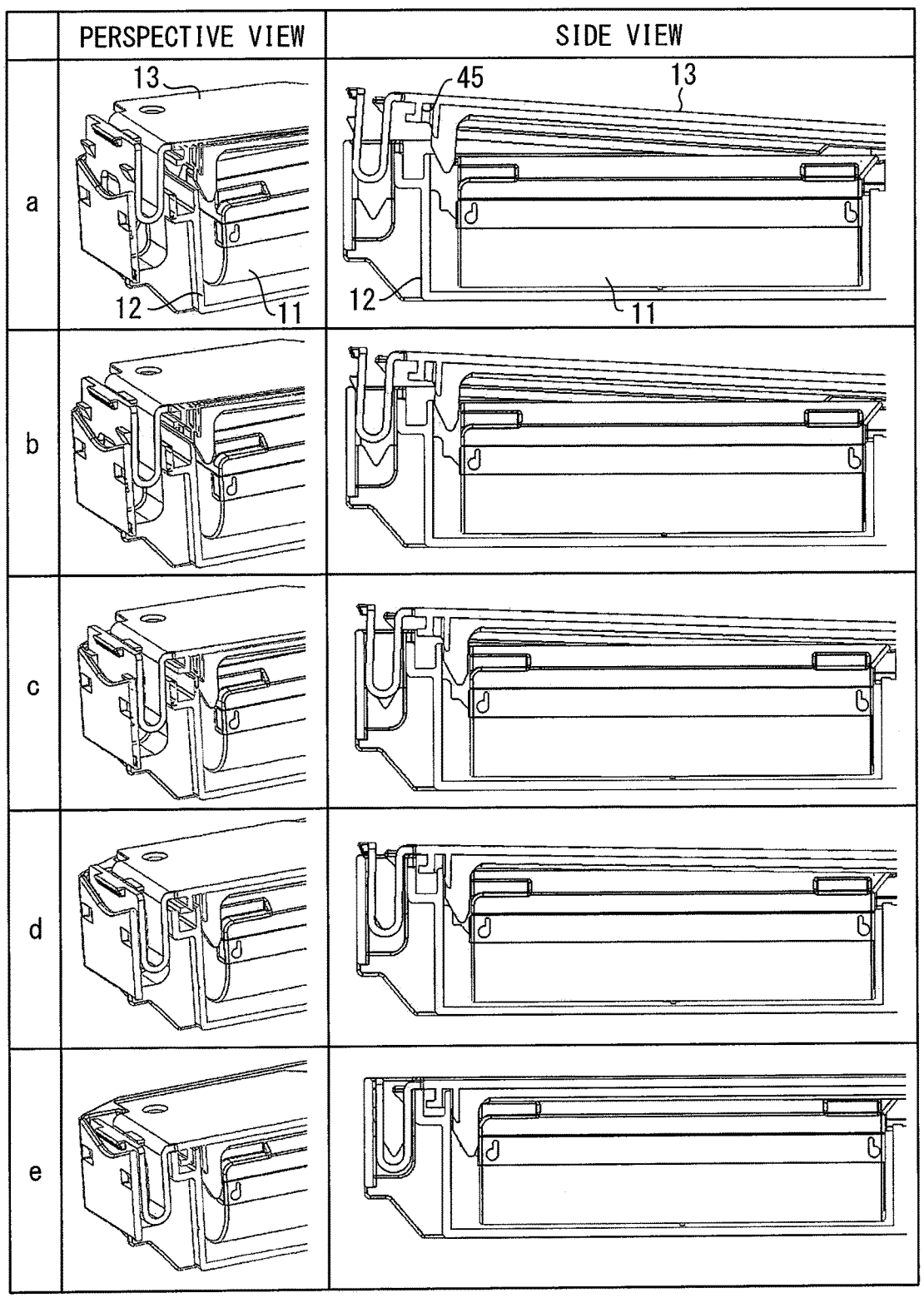
FIG. 9 is a diagram illustrating how the cover is attached.

As shown in FIG. 9, the pawl 41 of the cover 13 is inserted into the recessed portion 28 of the body case 12, and then the cover 13 is rotated toward the downward direction Z1. The snap-fitting portion 42 is inserted into the recessed portion 28 as being elastically deformed, and the tip of the restricting portion 44 abuts on the battery 11 in a state (c) illustrated in FIG. 9. The cover 13 is further rotated toward the downward direction Z1, whereby the restricting portion 44 presses the battery 11 and the pin 31 of the battery 11 moves along the positioning portion 26 in the groove 22. Thus, the pin 31 moves into a back of the positioning portion and is positioned at an end of the positioning portion 26 in the fixing direction X1.

The snap-fitting portion 42 is fixed to the receiving portion 29 when the pin 31 is positioned at the end of the positioning portion 26. As a result, the restricting portion 44 is fixed as pressing the battery 11 in the fixing direction X1. Thus, the restricting portion 44 restricts a displacement of the battery 11 in the removing direction X2. At the same time, the positioning portion 26 restricts a displacement of the battery 11 in the up-down direction Z. The cover 13 covers the housing chamber 12b as shown in FIG. 1.

A movement of the battery 11 when being removed will be described hereafter referring to FIG. 10 to FIG. 13. In removing the battery 11, the cover 13 is removed first. In removing the cover 13, the snap-fitting portion 42 is elastically deformed such that the pawl 41 comes out from the insertion hole 29a. Thus, the cover 13 is released and can be removed.

Figure 10:
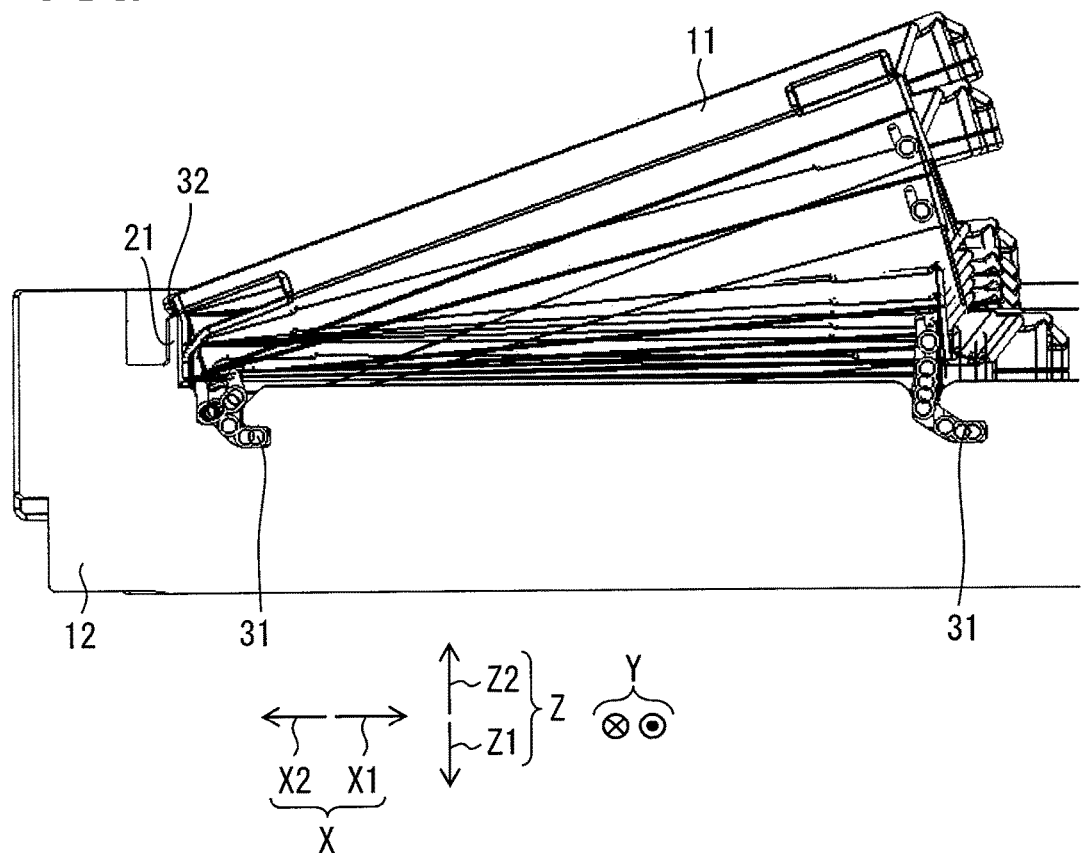
FIG. 10 is a diagram illustrating how the cover is removed.

Subsequently, as shown in FIG. 3, a side surface 11a of the battery 11 in the fixing direction X1 is pressed toward the removing direction X2. As shown in FIG. 10, since the cover 13 does not have the restricting portion 44, the pin 31 moves in the removing direction inside the positioning portion 26 of the groove 22 to a flat surface 27a of the corner 27. When the pin 31 is located on the flat surface 27a, the pin 31 in an end portion of the battery 11 in the fixing direction X1 is positioned in the receiving portion 24 of the groove 22 as shown in a state (d) illustrated in FIG. 12. Accordingly, the pin 31 in the end portion of the battery 11 in the fixing direction X1 slides toward the removing direction X2 and is capable of moving in the up-down direction Z, whereby an end portion 11b of the battery 11 in the fixing direction X1 can be pulled up in the upward direction Z2. In other words, by positioning the pin 31 in the corner 27, a position of the pin 31 in the fixing direction X1 is set such that the end portion 11b can be pulled up. When the end portion 11b is pulled up in the upward direction Z2, the tip of the water-stop rib 21 in an end portion of the body case 12 in the removing direction X2 and the bulge 32 serve as a fulcrum, and the battery 11 can be rotated as shown in FIG. 10 and removed.

Figure 11:
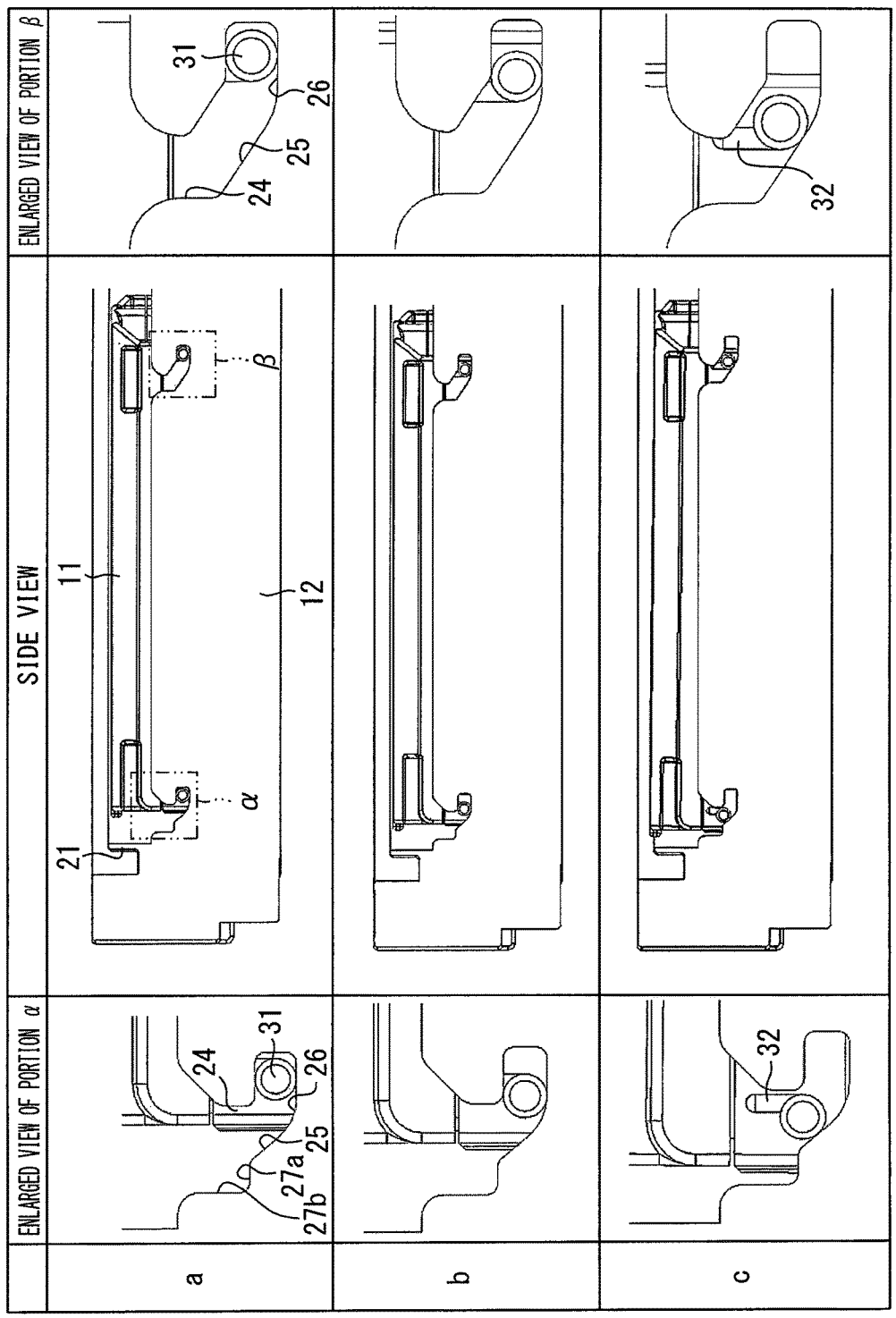
FIG. 11 is a diagram illustrating how the cover is removed.

FIG. 11 shows movements of the battery 11 when being removed. When the cover 13 is removed but the battery 11 is still fixed, the pin 31 is press-fitted into the positioning portion 26 as shown in a state (a) shown in FIG. 11. The side surface 11a is pressed in the removing direction as shown in a state (b) and a state (c) shown in FIG. 11 to slide in the removing direction X2. Then, the pin 31 moves to the corner 27 as shown in the state (d) shown in FIG. 12. That is, the pin 31 moves along the inclined portion 25 and comes to the stopper surface 27b of the corner 27 only by pressing the battery 11 in the removing direction X2, e.g., using a finger of a user. The pin 31 is stably supported by positioning the pin 31 on the flat surface 27a of the corner 27. The water-stop rib 21 is located adjacent to the bulge 32 in the up-down direction Z when the pin 31 is located in the corner 27.

When the end portion 11b is pulled up as shown in a state (e) illustrated in FIG. 12, the upper rim of the water-stop rib 21 supports the bulge 32 therefore the bulge 32 can serve as a fulcrum and rotates the battery 11. Thus, the pin 31 in the end portion of the battery 11 in the fixing direction X1 comes out from the groove 22 as shown in a state (f) illustrated in FIG. 12 in a phased manner.

Figure 13:
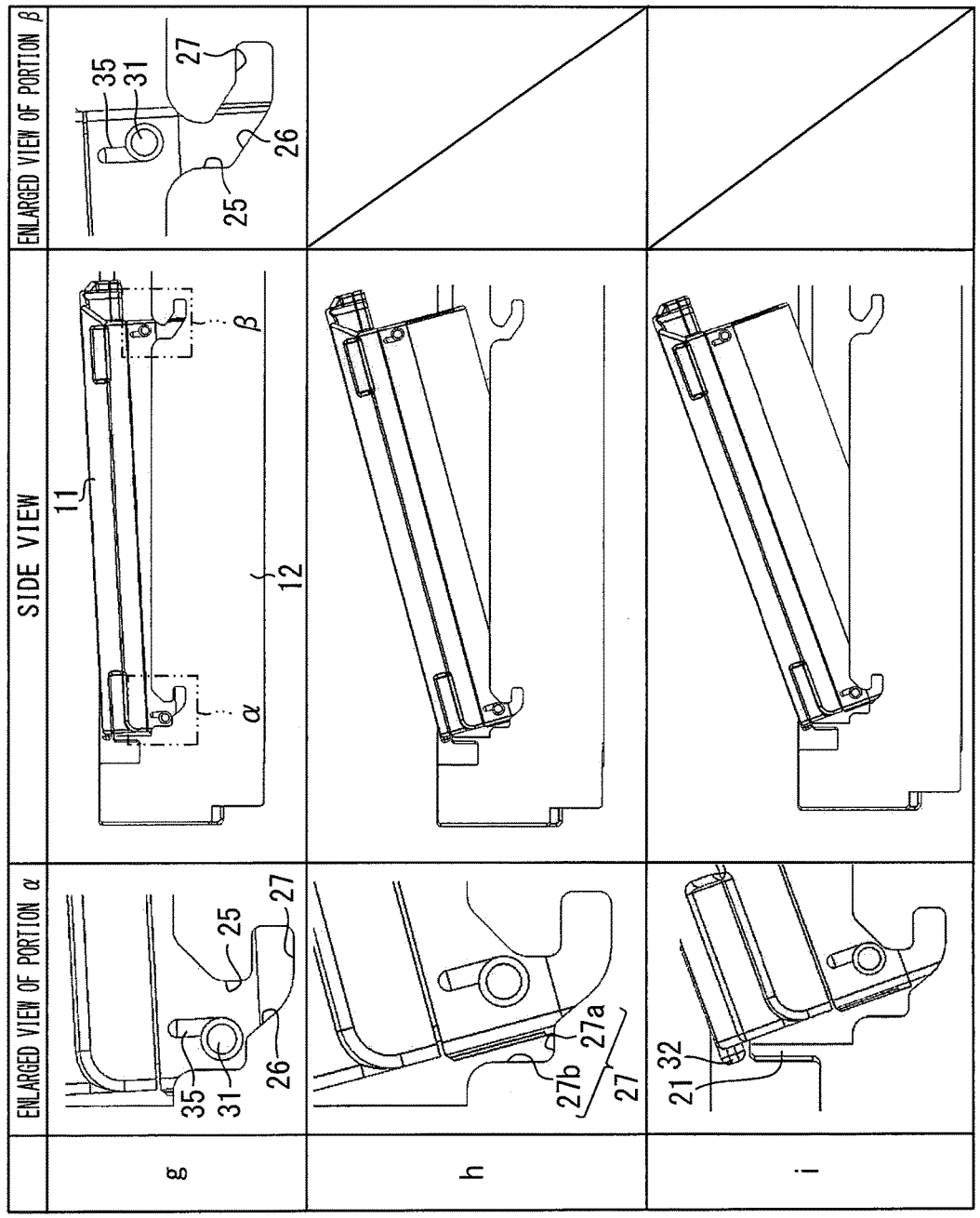
FIG. 13 is a diagram illustrating how the cover is removed.

By further rotating the battery 11 as shown in states (g), (h) and (i) illustrated in FIG. 13, the end portion 11b of the battery 11 comes out from the housing chamber 12b. Then, the user can grab the battery 11 and remove the battery 11 from the body case 12.

Figure 14:
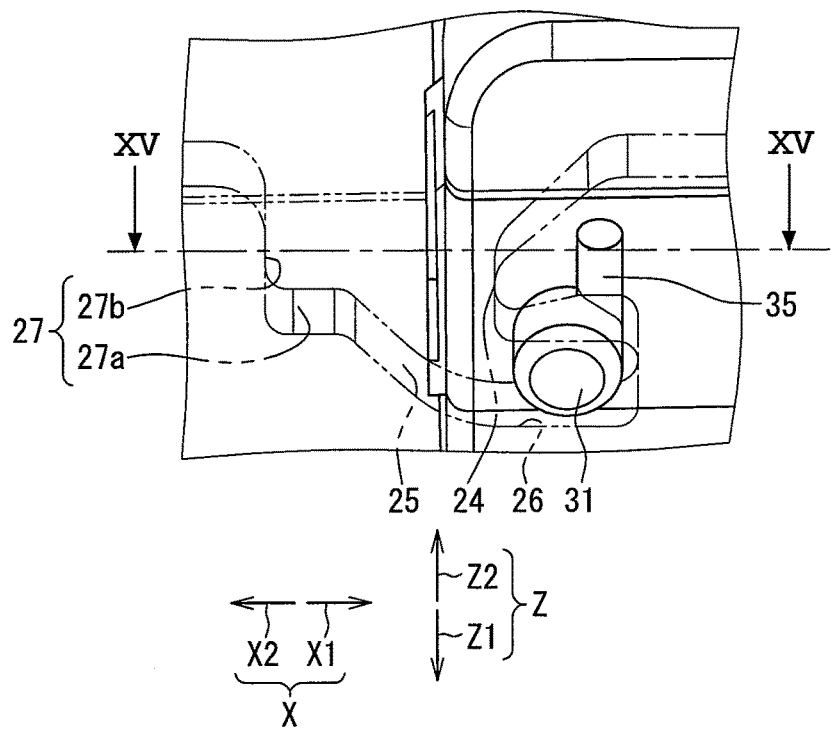
FIG. 14 an enlarged view illustrating a pin and a groove.
Figure 15:
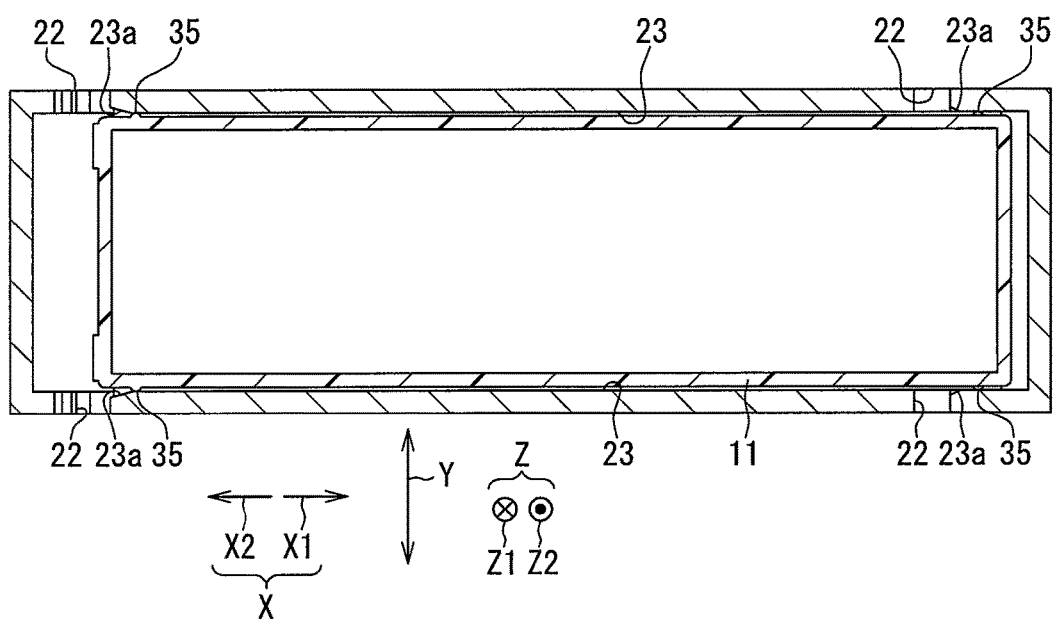
FIG. 15 is a cross-sectional view taken along a line XV-XV shown in FIG. 14.

As shown in FIG. 14, a side surface provided with the pin 31 includes a protruding portion 35 that is located adjacent to the pin 31. In the present embodiment, as shown in FIG. 15, the battery 11 has two surfaces facing each other, and each of the two surfaces includes two protruding portions 35 distanced from each other in the longitudinal direction X similar to the pins 31. The protruding portions 35 protrude outward from the two surfaces of the battery 11. The protruding portions 35 extend from the pins in the upward direction Z2. In addition, the protruding portions 35 have a semi-circular shape in cross section viewed in the down direction. Therefore, a surface of the protruding portions 35 in the fixing direction X1 is formed such that a protruding amount of the protruding portions 35 increases toward the removing direction X2. Since the protruding portions 35 have the semi-circular shape, the protruding portions 35 are in linear-contact with the sidewall 23.

As shown in the state (c) illustrated in FIG. 11, the protruding portions 35 face the receiving portion 24 and are not in contact with the sidewall 23, which defines the housing chamber 12b and includes the groove 22, when the pin 31 engages with the receiving portion 24. As shown in the state (a) illustrated in FIG. 11, the protruding portions 35 are in contact with the sidewall 23 when the pin 31 engages with the positioning portion 26.

As shown in FIG. 15, the sidewall 23 includes a tapered portion 23a. The tapered portion 23a includes an inclined surface in the fixing direction X1 and is tapered to decrease a dimension of the housing chamber 12b in the width direction Y toward the fixing direction X1. Therefore, when the battery 11 moves toward the fixing direction X1 and attached to the body case 12, the protruding portions 35 seal a clearance between the side surface of the battery 11 and the sidewall 23 defining the housing chamber 12b. Since a tip of the each protruding portion 35 has an arc shape, the tip of the protruding portion 35 is in linear-contact with the sidewall 23. Therefore, the protruding portions 35 moves toward the inserting direction smoothly while being in linear-contact with the sidewall 23, and the battery 11 is press-fitted into the housing chamber 12b loosely. Thus, since the tips of the protruding portions 35 are in contact with the sidewall 23, a displacement of the batter 11 in the width direction Y can be restricted.

As described above, in the fixing device of the present embodiment, the pin 31 engages with the positioning portion 26 in a fixing state where the battery 11 is fixed inside the body case 12. As a result, a displacement of the pin 31 in the up-down direction Z is restricted. In the fixing state, a displacement of the battery 11 with respect to the body case 12 in the removing direction X2 is restricted by the restricting portion 44 of the cover 13. As a result, a displacement of the battery 11 both in the up-down direction Z and the longitudinal direction X is restricted, therefore the battery 11 can be fixed in the housing chamber 12b certainly.

In fixing the battery 11, a position of the battery 11 in the housing chamber 12b is set such that the pin 31 engages with the receiving portion 24 of the groove 22. By attaching the cover 13, the restricting portion 44 of the cover 13 presses the battery 11, and the pin 31 engages with the positioning portion 26 that extends in the fixing direction X1, i.e., the intersecting direction. Accordingly, the battery 11 can be fixed only by positioning the battery 11 in the housing chamber 12b and attaching the cover 13. That is, the battery 11 can be fixed in a simple way. Furthermore, the fixing device can be downsized since the battery 11 can be positioned in the positioning portion 26 without a knob or a pressing surface.

In other words, in attaching the battery 11, the pin 31 of the battery 11 moves to the inlet opening of the positioning portion 26, i.e., to a lower end of the inclining portion 25, due to the weight of the battery 11 (i.e., force of gravity) as shown by arrow I in FIG. 5 only by inserting the pin 31 of the battery 11 into the groove 22. Then, only by attaching the cover 13, the cover 13 presses the battery 11 in the fixing direction X1 as shown by arrow II in FIG. 5, therefore a position of the battery 11 is set. Therefore, in attaching the battery 11, the battery 11 and the cover 13 can be attached by inserting the pin 31 of the battery 11 into the groove 22 and attaching the cover 13 to the body case 12. In removing the battery 11, the battery 11 can be pulled up and removed only with one finger. In addition, since an entire periphery of the battery 11 is fixed, the battery 11 can be prevented from coming out from the housing chamber 12b when receiving impact and from causing noise by being moved inside the housing chamber 12b.

Specifically, since the pin 31 is press-fitted into the positioning portion 26, the battery 11 can be prevented from being removed due to impact applied thereto in the up-down direction Z. A displacement of the pin 31 in the fixing direction X1 is restricted by a surface (i.e., an end surface in the fixing direction X1) of the positioning portion 26, and a displacement of the pin 31 in the removing direction X2 is restricted by the restricting portion 44. Therefore, the battery 11 can be prevented from being removed due to impact applied thereto in the longitudinal direction X. In addition, the battery 11 can be prevented from being removed since a vibration of the battery 11 in the width direction Y is restricted by the protruding portion 35 and the sidewall 23.

The snap-fitting portion 42 of the cover 13 is fixed to the receiving portion 29 of the body case 12 by elastic force of the snap-fitting portion 42. The elastic force prevents the cover 13 from being removed when the cover 13 receives impact in the up-down direction Z. The water-stop rib 21 of the body case 12 engages with the water-stop groove 45 of the cover 13, therefore a displacement of the cover 13 both in the width direction Y and the longitudinal direction X is restricted. Thus, the cover 13 is prevented from being removed due to impact.

The present embodiment overcomes the above-described limitations (1) to (6). For overcoming the limitation (1), the fixing device has the body case 12 including an upper surface, the upper surface includes the opening 12a through which the battery 11 is inserted into the housing chamber 12b, and the battery 11 comes out from the housing chamber 12b in the upward direction Z2 through the upper surface of the body case 12.

For overcoming the limitation (2), the fixing device is not necessary to be provided with a knob etc. For overcoming the limitation (3), a clearance, which has a dimension enabling a finger to be inserted therein, is not defined between the side surface of the battery 11 and the sidewall 23 of the housing chamber 12b.

For overcoming the limitation (4), the battery 11 can be pulled up and removed only by being pressed in the removing direction X2. For overcoming the limitation (5), the battery 11 can be pulled up by being rotated while the bulge 32 of the battery 11 is in contact with the water-stop rib 21.

For overcoming the limitation (6), the pin 31 has a columnar shape thereby being in linear-contact with the groove 22. Accordingly, friction can be reduced, and the battery 11 can be attached and removed smoothly.

In the present embodiment, the groove 22 includes the inclining portion 25. By positioning the pin 31 to the receiving portion 24 of the groove 22, the pin 31 moves along the inclining portion 25 to the inlet opening of the positioning portion 26 due to the weight of the battery 11. Accordingly, the pin 31 can move to the inlet opening of the positioning portion 26 easily.

In the present embodiment, the receiving portion 24 includes the corner 27. The battery 11 includes the bulge 32. In the fixing state, the bulge 32 faces with the water-stop rib 21 at a location adjacent to the upper rim of the water-stop rib 21 in the up-down direction Z. Therefore, in removing the battery 11, the pin 31 is positioned on the flat surface 27a of the corner 27 stably, and then starting a rotation of the battery 11. In rotating the battery 11, the bulge 32 is in contact with the water-stop rib 21 and serves as the fulcrum. Thus, the battery 11 can rotate easily and can be removed easily.

In the present embodiment, the side surface of the battery 11 includes the protruding portions 35. In the fixing state, the protruding portions 35 are in contact with the sidewall 23 defining the housing chamber 12b. Therefore, the protruding portions 35 can seal a clearance defined between the sidewall 23 of the housing chamber 12b and the side surface of the battery 11. As a result, a displacement of the battery 11 in the width direction Y can be restricted. Positions of the protruding portions 35 in the side surface of the battery 11 is set such that the protruding portions 35 are distanced from the sidewall 23 defining the housing chamber 12b when the pin 31 is located in the receiving portion 24 of the groove 22. Therefore, the protruding portions 35 are not in contact with the sidewall 23 before the battery 11 is set to the fixing state, thereby do not interrupting attaching and removing the battery 11.

Other Embodiments

While the present disclosure has been described with reference to preferred embodiments thereof, it is to be understood that the disclosure is not limited to the preferred embodiments and constructions. The present disclosure is intended to cover various modification and equivalent arrangements within a scope of the present disclosure.

It should be understood that structures described in the above-described embodiment are preferred structures, and the present disclosure is not limited to have the preferred structures. The scope of the present disclosure includes all modifications that are equivalent to descriptions of the present disclosure or that are made within the scope of the present disclosure.

In the above-described embodiment, the pin 31 has the columnar shape however not limited to have the columnar shape. The pin 31 may have a polygonal shape, a conical shape, or a conical shape having a polygonal shape in cross section. In the above-described embodiment, a quantity of the pins 31 is four and a quantity of the grooves 22 is four. However, the quantities are not limited as long as being one or more.

In the above-described embodiment, the battery 11 includes the pin 31, and the sidewall 23 defining the housing chamber 12*b* includes the groove 22. However, the pin 31 may be provided with one of the battery 11 and the sidewall 23, and the groove 22 may be provided with the other one of the battery 11 and the sidewall 23. That is, the battery 11 may include the groove 22, and the sidewall 23 may include the pin 31.

In the above-described embodiment, the groove 22 includes the inclining portion 25, however the groove 22 may not include the inclining portion 25. For example, the receiving portion 24 intersects with the positioning portion 26 to be perpendicular to each other in the groove 22. In this example, the positioning portion 26 extends from a lower end of the receiving portion 24 in the fixing direction X1.

In the above-described embodiment, the fixing device fixes the battery 11 to the emergency call unit 10. However, the fixing device is not limited to fix the battery 11 to the body case 12 of the emergency call unit 10 as long as fixing an object in a body case. For example, the object may be an electronic device such as a circuit substrate and a mechanical component such as a gear box.

What is claimed is:

1. A fixing device that fixes an object in a body case, the fixing device comprising:
   the body case that therein defines a housing chamber in which the object is housed;
   the object that is housed in the housing chamber; and
   a cover that is in contact with the body case and covers the housing chamber when the object is housed in the housing chamber, wherein
   the body case has one of a groove and a protrusion that engage with each other,
   the object has an other one of the groove and the protrusion,
   the groove includes
      a receiving portion that extends in an inserting direction in which the object is inserted into the housing chamber and
      a positioning portion that extends in an intersecting direction intersecting with the inserting direction,
   the receiving portion has an end in the inserting direction, and the positioning portion extends from the end of the receiving portion in the intersecting direction,
   the cover has a restricting portion that is in contact with the object while the cover covers the housing chamber,
   the protrusion engages with the positioning portion when the object is fixed in the body case, and
   the restricting portion restricts a displacement of the object relative to the body case in a direction opposite to the intersecting direction.

2. The fixing device according to claim 1, wherein
   the receiving portion has an inclining portion,
   the inclining portion inclines relative to the inserting direction and extends from the end of the receiving portion to be away from the end of the receiving portion in the intersecting direction as extending toward the inserting direction, and
   the positioning portion extends from an end of the inclining portion, which faces an end of the inclining portion adjacent to the object, in the intersecting direction.

3. The fixing device according to claim 1, wherein
   the groove is one of a plurality of grooves that are arranged in the intersecting direction to be distanced from each other,
   the protrusion is one of a plurality of protrusions that are arranged in the intersecting direction to be distanced from each other,
   the body case has a sidewall defining the housing chamber and including the plurality of grooves,
   the object has a surface extending in the inserting direction and in the intersecting direction and including the plurality of protrusions,
   the receiving portion includes a flat surface and a stopper surface defining a corner together with the flat surface, the flat surface extending in the intersecting direction, the stopper surface restricting a displacement of the object in a direction opposite to the intersecting direction,
   the object includes a surface intersecting with the intersecting direction and including a bulge,
   the body case includes a supporting portion that protrudes from the body case in a direction opposite to the inserting direction, and
   when the protrusion is located on the flat surface in the corner,
      the bulge is located between the supporting portion and the corner in the direction opposite to the inserting direction and
      the bulge is in contact with the supporting portion and serves as a fulcrum to move an opposite surface of the object, which faces the surface including the bulge, in the direction opposite to the inserting direction.

4. The fixing device according to claim 3, wherein
   the groove is one of a plurality of grooves that are arranged in the intersecting direction to be distanced from each other,
   the protrusion is one of a plurality of protrusions that are arranged in the intersecting direction to be distanced from each other,
   the sidewall of the body case includes the plurality of grooves,
   the object includes a surface intersecting with the inserting direction and the intersecting direction and including the plurality of protrusions,
   the surface of the object including the plurality of protrusions further includes a protruding portion, and
   the protruding portion of the object:
      has a protruding amount that increases toward the direction opposite to the intersecting direction;
      faces the receiving portion of the body case and is distanced from the sidewall of the body case, which defines the housing chamber and includes the plurality of grooves, when the protrusion engages with the receiving portion; and is in contact with the sidewall of the body case, which defines the housing chamber and includes the plurality of grooves, when the object is fixed to the body case.

5. The fixing device according to claim 1, wherein the protrusion has a columnar shape.

6. A fixing device that fixes an object therein, the fixing device comprising:

a body case;

a housing chamber that is defined in the body case and houses the object; and a cover that is in contact with the body case and covers the housing chamber when the object is housed in the housing chamber; wherein the body case includes one of a groove and a protrusion that engage with each other, the object includes an other one of the groove and the protrusion, the groove includes a receiving portion that extends in an inserting direction in which the object is inserted into the housing chamber and a positioning portion that extends in an intersecting direction intersecting with the inserting direction, the receiving portion has an end in the inserting direction, and the positioning portion extends from the end of the receiving portion in the intersecting direction, the cover has a restricting portion that is in contact with the object while the cover covers the housing chamber, the protrusion engages with the positioning portion when the object is fixed in the body case, and the restricting portion restricts a displacement of the object relative to the body case in a direction opposite to the intersecting direction.

* * * * *